United States Patent
Yamashita

[11] 3,981,580
[45] Sept. 21, 1976

[54] METHOD AND A SYSTEM FOR CONCURRENTLY COPYING BOTH SIDES OF AN ORIGINAL

[75] Inventor: Hajime Yamashita, Yokohama, Japan

[73] Assignee: Ricoh Co., Ltd., Tokyo, Japan

[22] Filed: Nov. 5, 1974

[21] Appl. No.: 521,146

[30] Foreign Application Priority Data
Nov. 12, 1973  Japan.............................. 48-126218

[52] U.S. Cl..................................... 355/24; 355/77
[51] Int. Cl.².................... G03B 27/32; G03B 27/52
[58] Field of Search........................... 355/23, 24, 77

[56] References Cited
UNITED STATES PATENTS
2,578,320  12/1951  Schubert............................. 355/23
3,079,839  3/1963  Lohner et al. ....................... 355/24

Primary Examiner—Richard A. Wintercorn
Attorney, Agent, or Firm—Cooper, Dunham, Clark, Griffin & Moran

[57] ABSTRACT

A method and a system are provided for concurrently copying both sides of an original by concurrently scanning nonoverlapping areas of the two sides of the original with two incident beams and scanning adjacent areas of a copy with the resulting reflected beams. Since the two incident beams illuminate areas of the original that are not overlapping, each reflected beam forms only an image of one side of the original, without a faint shadow of the other side of the original. When the original and the copy move in opposite directions and the ratio between their scanning speeds is the same as the ratio between the size of the original and the size of the copy, aligned portions of the opposite sides of the original can be aligned with each other on the copy even though non-aligned areas of the original are scanned by the incident beams.

15 Claims, 2 Drawing Figures

METHOD AND A SYSTEM FOR CONCURRENTLY COPYING BOTH SIDES OF AN ORIGINAL

BACKGROUND OF THE INVENTION

The invention relates to concurrently copying both sides of an original, and specifically to copying both sides of an original sheet onto photographic film.

There is a prior art rotary camera for simultaneously photographing both sides of a document on a film, and there is a prior art machine for simultaneously copying both sides of a document onto a copy sheet. In such prior art devices the two sides of the original are illuminated by incident beams through shielding plates having aligned windows and the reflected light is projected onto a film or onto a copy sheet. One disadvantage with such prior art devices is that since the same part of the original is illuminated from both sides, some light is transmitted through the original to form a shadow, and each reflected beam contains both a reflected image and a transmitted shadow. Therefore, particularly where the original is somewhat transparent, a faint copy of the wrong side of the original is superimposed on the copy of the proper side of the original.

SUMMARY OF THE INVENTION

An object of the invention is to provide a method and a system for concurrently copying both sides of an original which avoids the prior art problem and a superimposed faint shadow of the wrong side of the original. A further object is to allow for aligning the copies of the two sides of the original.

In accordance with the invention, a first side of an original is scanned with a first incident beam and a second side of the original is scanned with a second incident beam to thereby provide a first and a second reflected beam. Each of the incident beams is elongated in a direction transverse to the original scanning direction. The incident beams are spaced from each other along the scanning direction where they are traversed by the original, whereby they do not illuminate overlapping portions of the original. The reflected beams scan a copy, e.g. scan adjacent areas on the same side of a copy, to thereby form thereon a copy image of the scanned portions of the original. When the original and the copy are scanned in opposite directions and the ratio between the scanning speeds of the original and of the copy is the same as the ratio between the scanned portion of the original and the scanned portion of the copy, the two sides of the original are aligned on the copy along the copy scanning direction even through nonoverlapping portions of the original are scanned.

In a specific embodiment of the invention, an original sheet moves in the scanning direction between two opaque plates which are parallel to each other and spaced by a small distinace to allow for the passage of the original sheet. The plates are opaque, except that each has a transparent window which is elongated in a direction transverse to the scanning direction. The two windows are spaced from each other along the scanning direction. The original passing between the plates is illuminated from both sides through the windows and the reflected images of the scanned portions of the original are projected onto a copy, e.g. on the same side of a copy such as photographic film, which is moving in a copy scanning direction. When the scanning directions of the original and of the copy are opposite each other, and the ratio between the speeds of the original and of the copy is the same as the ratio between the original size and the copy size, the two copied sides of the original are aligned on the copy with respect to the copy scanning direction.

The two plates may be simply stationary opaque plates with transparent windows, or each plate may be replaced by two opaque endless belts spaced from each other along the original scanning direction to define a transparent window therebetween.

DETAILED DESCRIPTION

Figure 1:
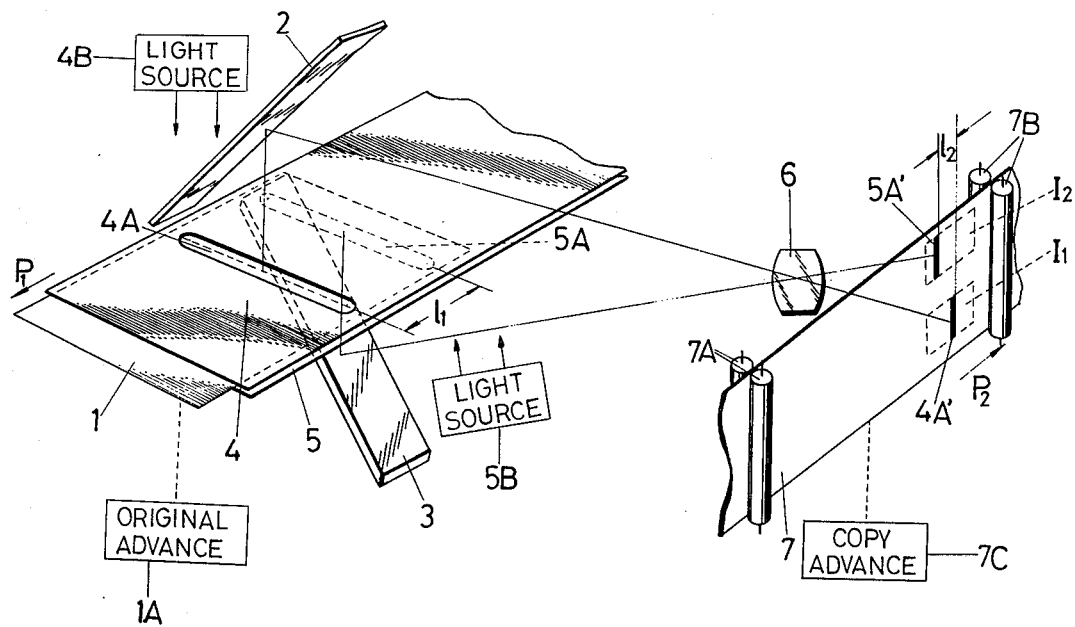
FIG. 1 is a perspective schematic view showing an embodiment of a device for concurrently copying both sides of an original in accordance with the invention.

Referring to FIG. 1, an original sheet 1 moves in an original scanning direction indicated by the arrow $P_1$ between two plates 4 and 5 which are provided, respectively, with windows 4A and 5A. The plates 4 and 5 are opaque and the windows therein are transparent. A light source 4B illuminates the top side of the original 1 through the window 4A and a light source illuminates the bottom side of the original 1 through the window 5A. The image reflected from the top side of the original 1 through the window 4A is projected by a mirror 2 and a lens 6 onto the side of a copy 7 which faces the lens 6, while the image reflected from the bottom side of the original 1 through the window 5A is projected by a mirror 3 and the lens 6 onto the same side of the copy 7. The copy 7 moves in a copy scanning direction indicated by the arrow $P_2$ between suitable pairs of rollers 7A and 7B. The windows 4A and 5B are spaced from each other along the original scanning direction by a distance $l_1$, whereby if both the original 1 and the copy 7 are stationary the images 4A' and 5A' thereof formed on the copy 7 are spaced from each other by a distance $l_2$. If the ratio between the speed $V_1$ of the original along the arrow $P_1$ and the speed of the copy along the arrow $P_2$ is the same as the ratio between the distances $l_1$ and $l_2$, then the copy $I_1$ of the bottom side and the copy $I_2$ of the top side of the original 1 on the copy 7 are aligned with each other along the copy scanning direction.

In operation, an original sheet 1, for example a bank check or a stock certificate, is inserted between the plates 4 and 5 and is moved in the original scanning direction, along the arrow $P_1$, by a suitable original advance 1A, at an original speed $V_1$. Concurrently, a copy 7, such as a roll of photosensitive film, is moved in the copy scanning direction, along the arrow $P_2$, by a suitable copy advance means 7C, at a copy scanning speed $V_2$. The reduction ratio, i.e., the ratio between the distance $l_1$ and the distance $l_2$ is selected to be a number K, and the ratio between the speeds of the original and of the copy is selected to equal the same number K. As the original 1 moves in the scanning direction, it reaches first the window 5A, whereby the copy image of the leading end thereof is formed at the right hand border of the copy area $I_2$. At this time no copy image is formed in the area $I_1$ on the copy 7. After the original moves through the distance $l_1$, its leading edge reaches the window 4A, and the image thereof is formed at the right hand edge of the copy area $I_1$. Thus, the copy images of the top and bottom of the original 1 are aligned vertically on the copy 7.

Figure 2:
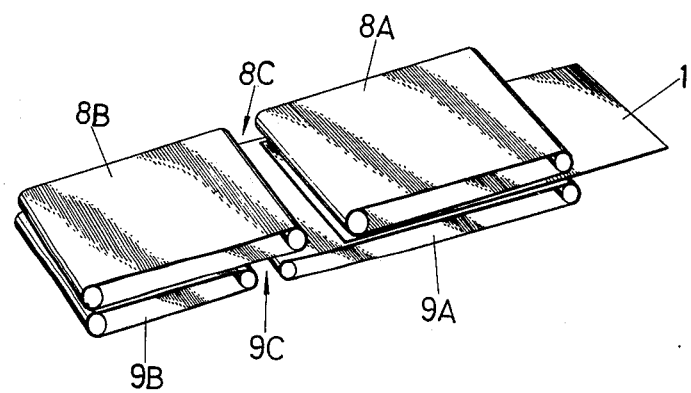
FIG. 2 is a perspective schematic view illustrating a modification of the device shown in FIG. 1.

Referring to FIG. 2, the top plate 4 may be replaced by a pair of endless belts 8A and 8B which are spaced from each other along the original scanning direction to define a window 8C, while the bottom plate 5 may be replaced by a pair of endless belts 9A and 9B which are spaced from each other along the original scanning direction to define a window 9C. The operation of the modification illustrated in FIG. 2 is similar to that of the device shown in FIG. 1. Specifically, the windows 8C and 9C are offset in the same manner as the windows 4A and 4B, and serve the same function, and the endless belts are opaque and serve the function of the plates 4 and 5. The distinction is that the original 1 is advanced not by an advance means acting directly on the original 1, but by suitably driving the endless belts so as to engage the original 1 thereby and to advance the original along the original scanning direction at the selected scanning speed. While no specific means is illustrated for driving the endless belts, it should be clear that any suitable drive for the endless belt rollers may be used.

A major advantage of the invented system for copying both sides of an original is that no shadow of the wrong side of the original appears on the copy because only one side of the original portion that is being copied is illuminated at any one time. An additional major advantage of the invention is that the copies of the original sides may be aligned along the scanning direction of the copy to be directly over each other. It should be clear that the scanning speeds of the original and of the copy can be selected differently to provide for different alignment of the copies and that the invented technique can be applied to copying any two sides of any suitable original onto one or two sides of any suitable copy material, with the copy material being photographic film, copy sheets or any suitable photosensitive surface.

I claim:

1. A system for concurrently copying both sides of an original having a selected length and a selected width onto the same side of a copy having a selected length and a selected width comprising:
 a first and a second opaque plate overlapping each other and spaced dfrom each other by a small distance to allow the original to pass therebetween in an original scanning direction which is parallel to the length of the original, each plate having an elongated transparent window transverse to the original scanning direction and the windows being spaced from each other along the original scanning direction by a distance which is less than the length of the original;
 means defining a passageway through which the copy moves in a copy scanning direction which is parallel to the length of the copy;
 means for forming a reflected light image of the portions of the original scanned by said windows as the original moves in said original scanning direction; and
 means for scanning adjacent areas of the same side of the copy with said reflected light image as the copy moves along said copy scanning direction, said adjacent areas being side-by-side across the width of the copy and being coextensive along the length of the copy.

2. A system as in claim 1 wherein said original and copy scanning directions are opposite each other and the ratio between the speed of the original in the original scanning direction and the speed of the copy in the copy scanning direction corresponds to the ratio between the size of the original portion scanned by said windows and the size of the light image thereof with which the copy is scanned.

3. A system as in claim 2 wherein said ratios are the same.

4. A system as in claim 1 wherein each plate comprises a first and a second endless belt spaced from each other in the original scanning direction to form said window, each belt adapted to engage the original and to rotate in a direction for moving the original in the original scanning direction.

5. A system for concurrently copying both sides of an original having a selected length and a selected width onto a copy having a selected length and a selected width comprising:
 means for scanning a first and a second side of the original along the length of the original with a first and a second incident beam respectively to thereby provide a first and a second reflected beam respectively, each of the incident beams being elongated in a direction along the width of the original and said incident beam being spaced from each other along the length of the original; and
 means for scanning a first and a second area on the same side of the copy with said first and second reflected beam respectively to thereby form thereon copy images of the portions of the original scanned by said first and second incident beam, said first and second areas of the copy being spaced from each other along the width of the copy and being coextensive along the length of the copy.

6. A system as in claim 5 wherein each of said first and second incident beam is stationary and the original moves in the direction of its length to traverse said incident beams.

7. A system as in claim 6 wherein each of said first and second reflected beam is stationary and the copy moves in the direction of its length to traverse said reflected beams.

8. A system as in claim 7 wherein the directions in which the original and the copy move are opposite each other.

9. A system as in claim 8 wherein the ratio between the scanning speeds of the original and of the copy corresponds to the ratio between the size of the portion of the original which is being copied and the copy image thereof.

10. A system as in claim 1 wherein the means for forming said reflected light image comprise a single imaging lens interposed between the original and the copy and first and second mirror directing an image of the portion of the original visible through said respective first and second plate through said single lens to form said reflected light image, there being no other lenses between the original and the copy.

11. A method of concurrently copying both sides of an original onto the same side of a copy comprising the steps of:
 scanning a first side of the original with a first incident beam and a second side of the original with a second incident beam to thereby provide a first and a second reflected beam, each of said incident beams being elongated in a direction transverse to the original scanning direction and the locations on the original where said incident beams impinge being spaced from each other along the scanning directions by a distance which is less than the size of the original in the scanning direction; and scanning, in a copy scanning direction, a first and a second area of the copy, which are on the same side of the copy and are spaced from each other along a direction transverse to the copy scanning direction, with said first and second reflected beam respectively to thereby form thereon a first and a second copy image of the portions of the original scanned by said first and second incident beam respectively.

12. A method as in claim 11 wherein the incident beams are stationary and the step of scanning the original comprises moving the original in the original scanning direction to traverse said incident beams.

13. A method as in claim 12 wherein the reflected beams are stationary and the step of scanning the copy comprises moving the copy along the copy scanning direction to traverse said reflected beams.

14. A method as in claim 13 wherein the original scanning direction and the copy scanning direction are opposite each other.

15. A method as in claim 14 wherein the ratio between the scanning speeds of the original and of the copy corresponds to the ratio between the size of the portion of the original which is being copied and the copy image thereof.

* * * * *